INVENTOR.
HARRY L. COOKE
BY
Charles H. Brown
ATTORNEY

INVENTOR.
HARRY L. COOKE
BY Charles H. Brown
ATTORNEY

INVENTOR.
HARRY L. COOKE
BY Charles H. Brown
ATTORNEY

United States Patent Office 2,919,308

Patented Dec. 29, 1959

2,919,308

TIME DIVISION MULTIPLEX SYSTEM FOR SIGNALS OF DIFFERENT BANDWIDTH

Harry L. Cooke, Port Jefferson, N.Y., assignor to Radio Corporation of America, a corporation of Delaware Application March 23, 1954, Serial No. 418,165

8 Claims. (Cl. 179—15)

This invention relates to multi-channel time division pulse multiplex systems for the transmission and reception of communications, and more particularly to such systems wherein some of the channels are suitable for handling relatively narrow band signals and others are suitable for handling relatively wide band signals.

A time division pulse multiplex system may, for example, have twenty-four separate message channels. At the transmitting terminal, twenty-four input channel units, each receptive to a message signal, are successively energized, and the separate outputs are combined to form a pulse train wave having one sample of each message signal per cycle of the pulse train wave. The pulse train wave is transmitted by radio or transmission line to a receiving terminal where twenty-four output channel units, all receptive to the pulse train wave, are successively energized once per cycle of the pulse train wave. The outputs of the twenty-four output channel units at the receiving terminal correspond to the twenty-four separate message signals fed in at the transmitting terminal.

In both the transmitting terminal and the receiving terminal, the channel units are energized in succession by means of an electronic commutator consisting of an interlaced stepwave generator system. Continuing the example of a twenty-four channel system, the electronic commutator may have a four-step master generator which produces a stepwave having four progressively higher steps or risers per stepwave cycle. Four sub-stepwave generators are receptive to the output of the master stepwave generator, and each of the sub-stepwave generators is biased to generate a stepwave having a step or riser coinciding with a different respective one of the four steps or risers of the master stepwave. A counter coupled to the four-step master generator counts six complete stepwave cycles of the master generator and produces a pulse, for every six cycles of the master generator, which is applied to the four sub-stepwave generators to determine the period of the sub-stepwaves. Each of the four sub-stepwaves thus have six risers, making a total of twenty-four interlaced risers equally spaced in time.

Each of the sub-stepwaves having six risers is applied to a group of six channel units. The channel units are biased to be rendered conductive for a short time in response to a different respective one of the progressively higher risers of the sub-stepwave applied thereto. In this way, the twenty-four channel units are successively energized. The stepwave system may be considered to be an electronic commutator.

In the time division pulse multiplex system described above, all twenty-four channels are gated at the same frequency and thus are all capable of handling signals of a given predetermined bandwidth, such as 3400 cycles per second. Such a system is shown and described in U.S. Patent No. 2,543,738 issued on February 27, 1951, to W. D. Houghton. It is a general object of this invention to provide a time division pulse multiplex system having all the advantages of the system described in the aboveidentified patent, and in addition, having improved provisions for handling message signals of different bandwidths.

It is another object of this invention to provide an improved electronic commutator.

It is a further object to provide an improved time division multiplex system adapted to be employed for either a large number of relatively narrow band signals, or a smaller number of relatively wide band signals, or any one of a number of combinations of signals of different bandwidth.

It is a still further object to provide a time division pulse multiplex system which by minor reconnections may be employed to handle message signals of different bandwidths as required by the changing traffic conditions.

In one aspect the invention comprises an electronic commutator for use in a time division multiplex system consisting of a master stepwave generator and a plurality of sub-stepwave generators having inputs coupled to the output of the master generator. Each of the sub-stepwave generators produces a stepwave having risers coinciding in time with risers of a predetermined level in said master stepwave. The maximum period of all of the sub-stepwaves is determined by a counter which counts the complete cycles of the master stepwave and applies a pulse to the sub-stepwave generators. Frequency multiplying multivibrators are inserted between the counter and some of the sub-stepwave generators to cause them to generate sub-stepwaves having a period which is a fraction of the above-mentioned maximum period. The sub-stepwaves are applied to banks of channel units. Each channel unit is biased to be rendered conductive for a short period of time following receipt of a riser of a predetermined level. As an example of a twenty-four channel system, the channel units which are energized from a sub-stepwave generator having a period determined by the counter may have bandwidths of 3400 cycles per second. The channel units which are energized from a sub-stepwave generator controlled thru a frequency doubling multivibrator from the counter are gated twice as often to provide signal channels having a bandwidth of 6800 cycles per second. The channel units controlled thru a frequency tripling multivibrator are gated three times as often and therefore can handle signals of 10,200 cycles per second in bandwidth.

These and other objects and aspects of the invention will appear from a reading of the following detailed description taken in conjunction with the appended drawings, wherein.

Figure 1:
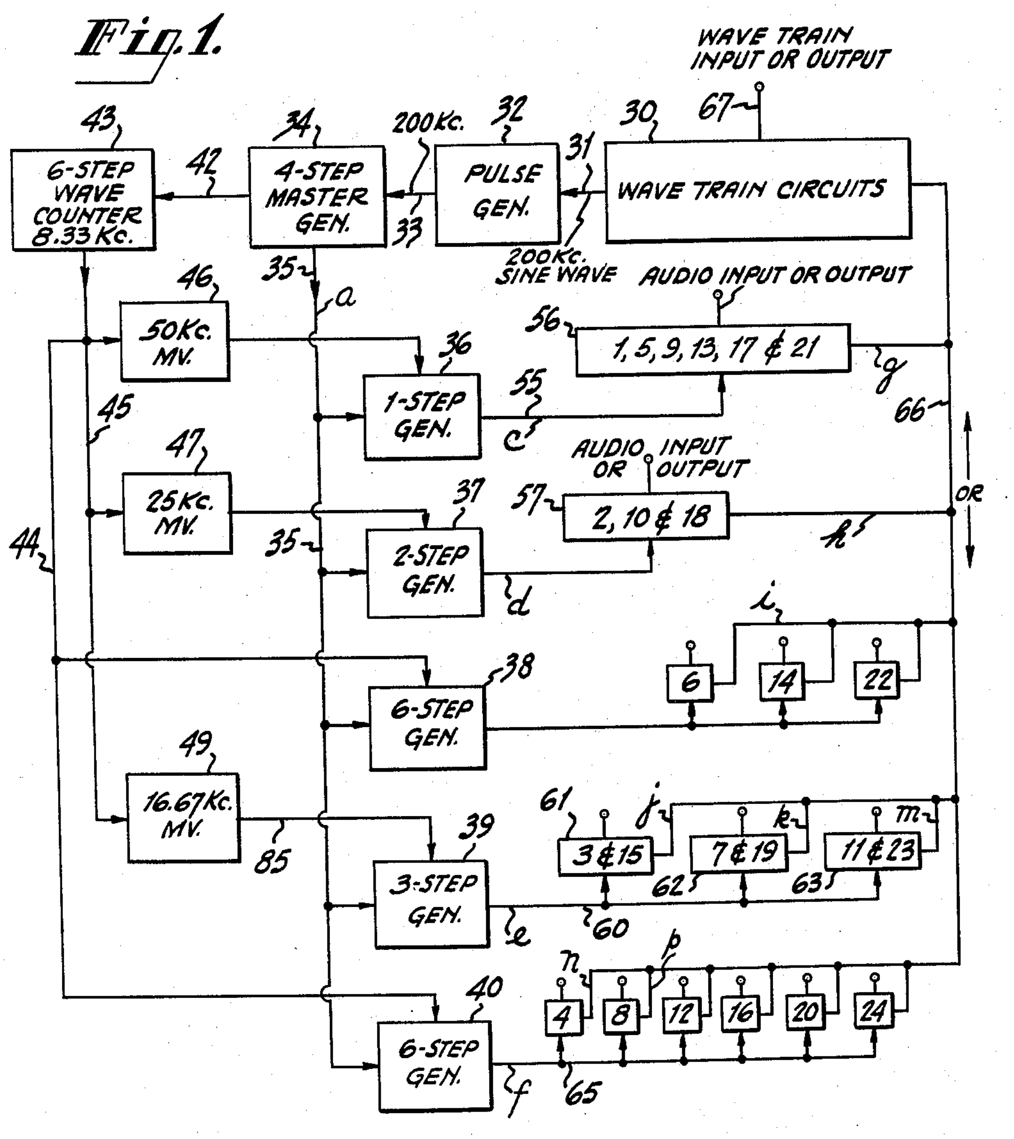
Figure 1 is a block diagram of a terminal equipment of a time division pulse multiplex system. The block diagram represents a transmitting terminal if used to generate a pulse train wave, and it represents a receiving terminal if used to receive a pulse train wave.

Figure 1 shows a block diagram of a time division pulse multiplex transmitting terminal or receiving terminal. The invention will first be described as applied to a transmitting terminal, and, by way of example, as applied to a time division pulse multiplex system wherein time is divided up into twenty-four units. If all of the twenty-four time units were allocated to separate message signal channels, it would be possible to handle twenty-four message signals simultaneously, each having a bandwidth of, say, 3400 cycles per second. The system illustrated in Figure 1 is capable of simultaneously handling nine message signal channels having a bandwidth of 3400 cycles per second, three channels having a bandwidth of 6800 cycles per second, one channel having a bandwidth of 10,200 cycles per second, and one channel having a bandwidth of 20,400 cycles per second. Figure 1 illustrates one system constructed according to the teachings of the invention, and it will be understood to those skilled in the art that various other combinations of different channels of different bandwidths may be provided.

When the circuit of Figure 1 is utilized as a transmitting terminal, the wave train circuits 30 include a source of a 200 kilocycle sine wave which is applied over lead 31 to a pulse generator 32. A 200 kilocycle pulse wave is applied from pulse generator 32 over lead 33 to a four-step master generator 34. The output bus 35 of the master generator 34 carries a stepwave as shown by waveform *a* of Figure 3. Bus 35 is connected to the inputs of sub-stepwave generators 36 thru 40.

Another output from the four-step master generator 34 is conveyed over coupling 42 to a six-step counter 43. Each of the stepwaves from master generator 34 has four steps or risers per cycle. The counter 43 counts out six complete stepwaves from the master generator 34 and then generates a single pulse which is conveyed over bus 44 to the sub-stepwave generators 38 and 40. The output of counter 43 is also applied over bus 45 to multivibrators 46, 47 and 49. The stepwave outputs of sub-stepwave generators 36 thru 40 are shown by the waveforms *c*, *d*, *d'*, *e* and *f* in Figure 3.

Figures 3, 4, 5:
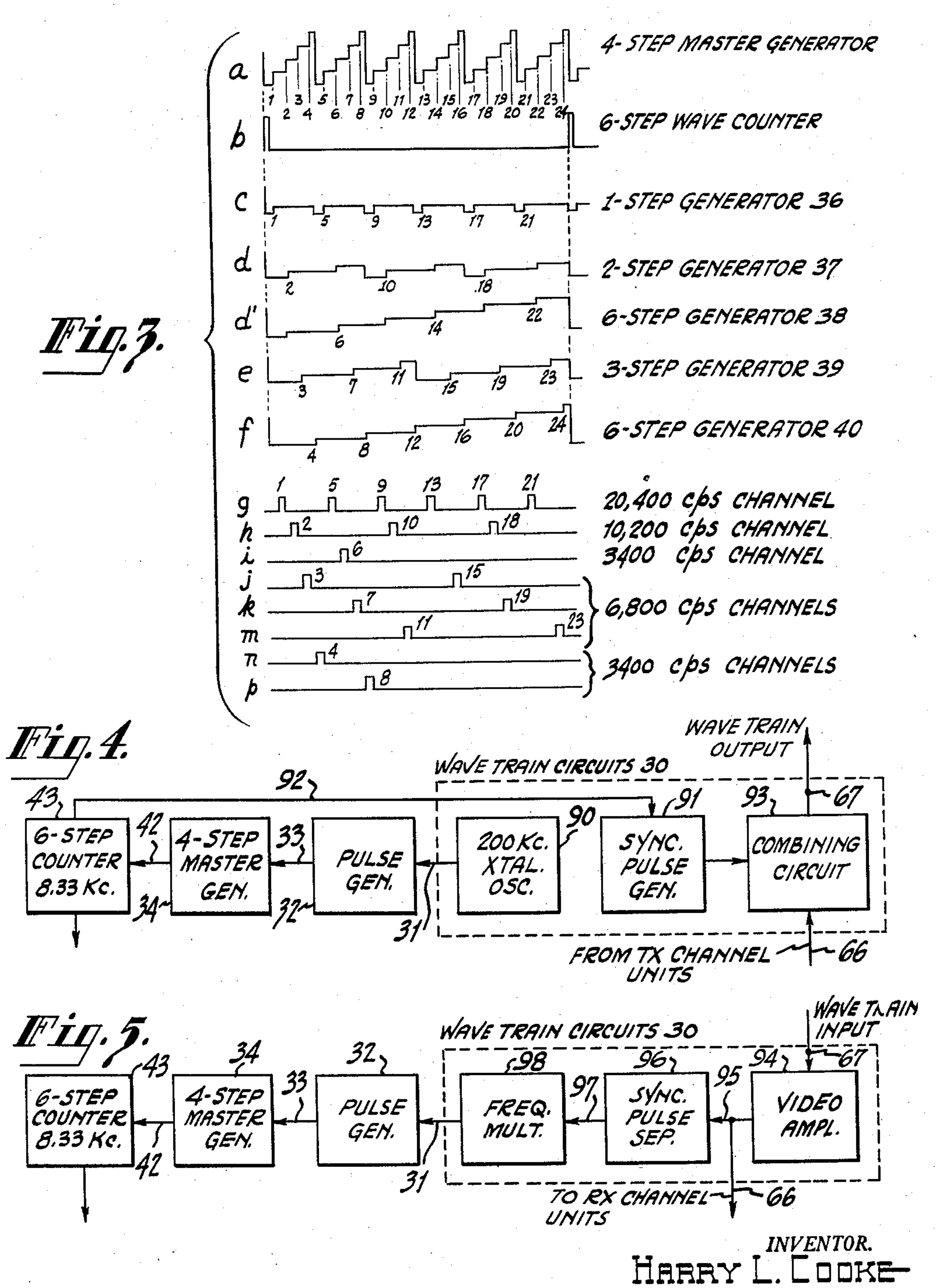
Figure 3 is a chart of voltage waveforms found at various designated points in the circuits of Figures 1 and 2.
Fig. 4 represents the wave train circuits when used as a transmitting terminal.
Fig. 5 represents a further embodiment of the wave train circuits when used as a receiving terminal.

The single-step stepwave *c* from sub-stepwave generator 36 is applied over lead 55 to a channel unit 56. If the channel unit 56 is a transmitting channel unit, the circuit thereof may be as shown in Figure 4 of the above-mentioned Houghton Patent No. 2,543,738. If channel unit 56 is a receiving channel unit, the circuit may be as shown in Figure 7 of the above-mentioned patent. According to the present example, time is divided into twenty-four units, and channel unit 56 is operative during time units 1, 5, 9, 13, 17 and 21.

The stepwave *d* from sub-stepwave generator 37 is applied to a channel unit 57 which may be exactly the same as channel unit 56. The stepwave output *d'* from sub-stepwave generator 38 is applied to three channel units designated 6, 14, and 22, the numeral designations also indicating the time units during which the channel units are operative. The stepwave *e* from sub-stepwave generator 39 is applied thru bus 60 to channel units 61, 62 and 63, each of which is operative during the time units corresponding with the numbers appearing in the boxes. The stepwave *f* from sub-stepwave generator 40 is applied over bus 65 to six channel units bearing numbers corresponding with the time units during which they are operative.

The outputs of all of the channel units are connected over bus 66 to the wave train circuits 30 where they are combined into a single pulse train wave available at the output terminal 67. The transmitting channel units wave train circuits 30 may be as shown and described in detail in the above-mentioned Patent No. 2,543,738. The wave train circuits 30 as used in a transmitting terminal are shown by Figure 4 to include a 200 kilocycle oscillator 90 coupled to the pulse generator 32, a synchronizing pulse generator 91 energized over lead 92 from the counter 43 and having an output applied to a combining circuit 93. Message modulated pulses from the several transmitting channel units are applied over lead 66 to combining circuit 93 and a wave train output including synchronizing pulses is provided at output terminal 67. The time allocated to channel 24 may be reserved for the synchronizing pulses, or an external synchronizing system may be employed between transmitting and receiving terminals.

Figure 2:
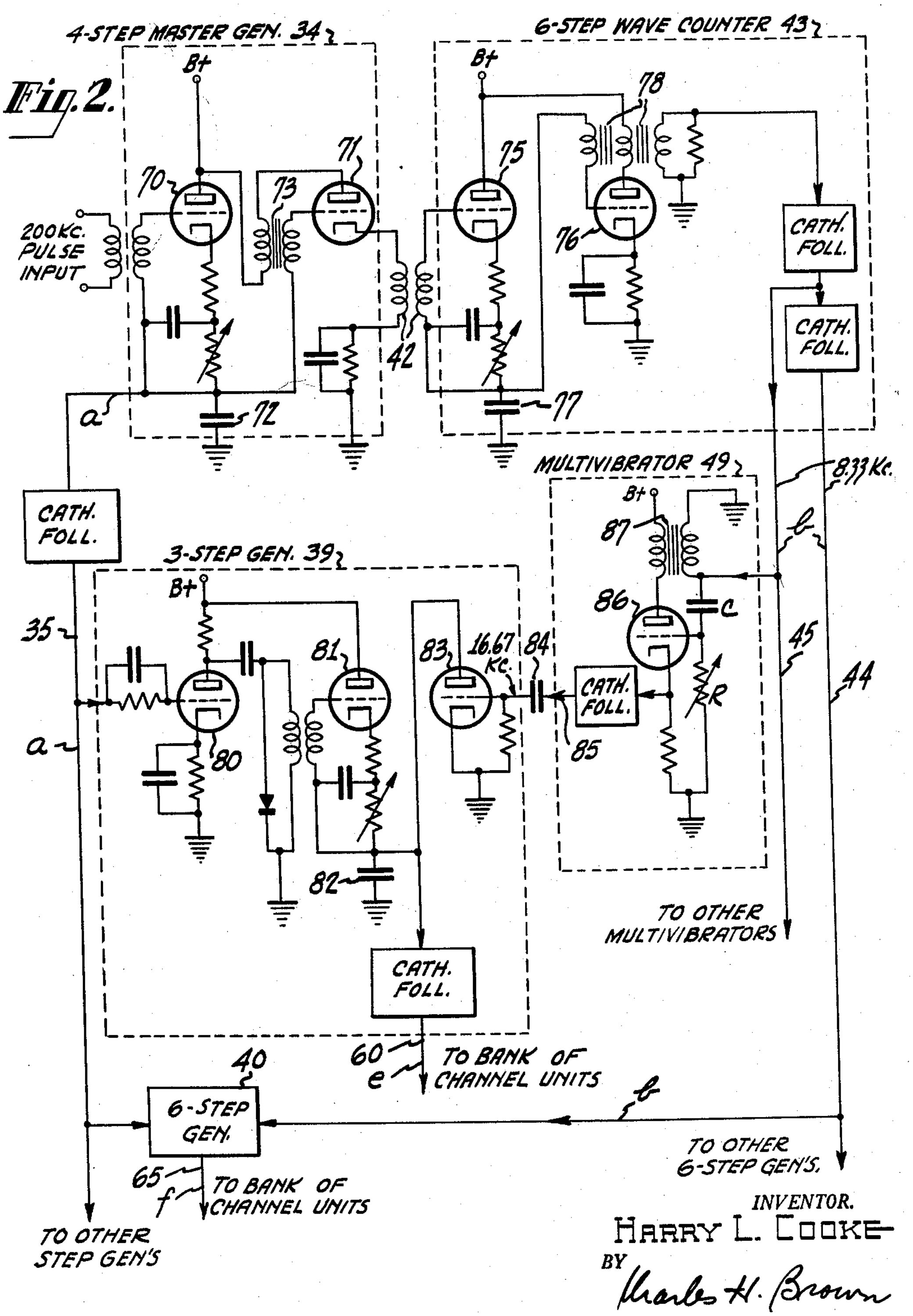
Figure 2 is a circuit diagram showing in detail some of the circuits represented by boxes in Figure 1.

Reference will now be made to Figure 2 for a description of circuits for use in the boxes of Figure 1. The four-step master generator 34 includes two normally non-conducting vacuum tubes 70 and 71. Every time a positive pulse is applied to the grid of tube 70, the tube conducts and causes an incremental charge to be stored on storage capacitor 72. After four input pulses have been applied to tube 70, the potential on capacitor 72 reaches a value which exceeds the bias on normally non-conducting tube 71. The pulse type transformer 73 is so poled that when vacuum tube 71 starts to conduct, a positive voltage is applied to the grid of tube 71 which further increases the current drawn by the tube. This action continues until the capacitor 72 is discharged by current flow thru the transformer 73 to the grid of tube 71. It is therefore apparent that tube 70 acts to add increments of charge to the storage capacitor 72, and that tube 71 acts to discharge the capacitor 72 after a predetermined number of steps or risers in the voltage waveform on the capacitor 72. The voltage waveform on the capacitor 72 is as shown by curve *a* of Figure 3.

The six-step wave counter 43 includes normally non-conducting vacuum tubes 75 and 76. The circuit of tube 75 is similar to the circuit of tube 70, and it includes a storage capacitor 77. Every time tube 71 conducts to discharge the storage capacitor 72, a positive pulse is coupled thru transformer 42 to the input circuit of tube 75 to render tube 75 conductive. Every time tube 75 is conductive, an increment of charge is placed on the storage capacitor 77. After six complete cycles or stepwaves in the output of the master generator 34, the potential on the storage capacitor 77 reaches a value which overcomes the bias on the normally non-conducting tube 76. When tube 76 starts to conduct, plate current flowing thru one winding of the pulse transformer 78 induces a positive potential in another winding connected to the grid of tube 76. This increases the current flowing thru tube 76, and the action continues in a rapid regenerative manner. In the process, the storage capacitor 77 is completely discharged. The pulse transformer 78 includes an output winding across which an output pulse is developed every time discharge tube 76 is conductive. This output is applied thru cathode followers to output buses 44 and 45. The waveform on buses 44 and 45 is as shown by waveform *b* of Figure 3.

All of the sub-stepwave generators 36 thru 40 in Figure 1 may include the same circuit differing only in that the various sub-stepwave generators may be biased to respond to different steps or risers of the four-stepwave received from the master generator 34 over bus 35. The circuit of sub-stepwave generator 39 is shown in Figure 2. The stepwave generator 39 includes a selector vacuum tube 80, a capacitor charging vacuum tube 81 for charging storage capacitor 82, and a capacitor discharging tube 83. The selector tube 80 is biased to conduct on receipt of voltage whose magnitude corresponds to a predetermined one of the four steps or risers in the stepwave from the master generator 34. In the present example, the sub-stepwave generator 39 is arranged so that selector tube 80 conducts upon the occurrence of the third riser in the stepwave *a*. When selector tube 80 conducts, a pulse is coupled to the capacitor charging tube 81 causing it to conduct and add an increment of charge to the storage capacitor 82. A stepwave is thus generated on storage capacitor 82 which continues rising by steps until the capacitor 82 is discharged by the action of discharge tube 83. Discharge tube 83 is normally non-conductive by reason of the charge developed on coupling capacitor 84 due to grid current flow when the tube conducts. Tube 83 is rendered conductive to discharge capacitor 82 when its grid receives a pulse from multivibrator 49.

Sub-stepwave generators 38 and 40 in Figure 1 have circuits similar to that of sub-stepwave generator 39 shown in Figure 2, but are receptive to discharging pulses from the counter 43 over bus 44, rather than from counter 43 thru a multivibrator. The sub-stepwaves from generators 38 and 40 are as shown by waveforms $d'$ and $f$, respectively, of Figure 3.

Multivibrator 49 is a conventional blocking oscillator which receives a pulse wave from counter 43 and operates to generate a pulse wave on output lead 85 having twice the frequency of the input pulse wave. When a positive pulse is applied to the grid of multivibrator tube 86, the tube is rendered conductive. The regenerative effect of the pulse type transformer 87 causes the tube 86 to conduct hard and charge the capacitor C negatively. When the input pulse is removed, the tube ceases to conduct and remains cut-off until the charge on capacitor C discharges sufficiently to allow the tube to conduct again. Thereafter, the tube remains cut-off until another pulse is received from the counter 43. The value of capacitor C and the constants of the circuit are such that the multivibrator generates a pulse wave having a frequency which is a multiple of the input pulse wave. Multivibrators 46 and 47 are the same as multivibrator 49 except that the circuit elements are selected to provide a frequency multiplication of six times and three times, respectively, of the input wave of 8.33 kc. supplied by counter 43.

The operation of the system will now be described with references to the voltage waveforms of Figure 3. The waveform $a$ of Figure 3 shows the output on bus 35 of the four-step master generator 34. Each stepwave has four steps or rises, and six complete stepwaves provides twenty-four steps or risers to complete one cycle of the twenty-four channel time division multiplex system shown herein by way of example. The complete cycle of the system is determined by the six-stepwave counter 43 which provides an output on buses 44 and 45 as shown by waveform $b$ of Figure 3.

The one-step generator 36 is receptive to the master stepwave $a$ of Figure 3 and is biased to generate a step or riser for every first step or riser of the four-step master generator. The risers of the one-step generator 36 occur at times 1, 5, 9, 13, 17 and 21. The output of the one-step generator 36 has only one step or riser because it is discharged six times for a complete cycle of the system by the output pulses from the 50 kilocycle multivibrator 46. The output of one-step generator 36 is therefore as shown by waveform $c$ of Figure 3. This waveform is applied to channel unit 56 which is biased to be operative following every one of the six spaced risers in the output of the one-step generator 36. Waveform $g$ of Figure 3 shows the six pulses per cycle in the channel unit 56 all of which are modulated by a single message signal. Because of the frequency of the pulses (the sampling rate), the message channel unit 56 is capable of handling signals having a bandwidth of 20,400 cycles per second, or six times the bandwidth of a 3400 cycle per second channel which is gated only once per complete cycle of the system.

The two-step generator 37 is biased to generate a wave having a step or riser during every second step or riser of the four-step master generator 34. The two-step generator 37 has only two steps or risers before it is discharged by a pulse from the 25 kilocycle multivibrator 47. The output waveform from the two-step generator 37 is shown by waveform $d$ of Figure 3. This waveform is applied to channel unit 57 which is biased to be operative following each first riser of the waveform $d$. Three of these risers occur during time units 2, 10 and 18 in one complete cycle of the system, and the pulses in the channel unit 57 are as shown by waveform $h$ of Figure 3. Due to the frequency with which the channel unit 57 is energized, the message channel is capable of handling signals having a bandwidth of 10,200 cycles per second.

A six-step generator 38 is discharged only once per complete cycle of the system by the waveform $b$ from the counter 43 to provide a waveform $d'$. The channel unit 6 is biased to be operative following the second riser in the output from generator 38, the channel unit 14 is biased to be operative following the fourth riser, and the channel unit 22 is biased to be operative following the sixth riser. These risers occur at the times 6, 14, and 22. Since each of the channel units 6, 14 and 22 is energized only once for a complete cycle of the system and there are independent message signals respectively applied to these channel units, these channel units are each capable of handling signals of only 3400 cycles per second in bandwidth, according to the example herein. One cycle of the pulse wave in channel unit 6 is shown by waveform $i$ of Figure 3.

The output of the three-step generator 39 is as shown by waveform $e$ of Figure 3. Since the generator 39 is discharged at twice the frequency of the system by the action of multivibrator 49, the generator 39 generates two complete stepwaves per cycle of the system. Channel unit 61 is biased to be operative following the first of the three risers of the three-step wave. This occurs at time units 3 and 15 as shown by waveform $j$ of Figure 3. Channel unit 61 is therefore capable of handling a message signal having a bandwidth of 6800 cycles per second. Channel unit 62 is biased to be operative following the risers occurring at time units 7 and 19, as shown by waveform $k$ of Figure 3. Similarly, channel 63 is operative during time units 11 and 23 as shown by waveform $m$. Both channel units 62 and 63 are capable of handling a message signal of 6800 cycles per second in the same manner as channel unit 61.

The output of the six-step generator 40 is as shown by waveform $f$ of Figure 3. Each of the six separate channel units 4, 8, 12, 16, 20 and 24 is biased to be operative following a different one of the risers of the waveform $f$. Each of these channel units is therefore capable of individually handling a message signal having a bandwidth of 3400 cycles per second.

The terminal connections appearing above the channel unit boxes shown in Figure 1 are locations to which the message wave signals are applied.

All of the outputs of the channel units are conveyed over bus 66 to the wave train circuits 30 where they are combined into a pulse train wave which is available at output terminal 67. The output wave train includes all of the pulses of the channel units as they appear sequentially, the pulses being modulated with the message signals applied to the channel units.

When the invention is applied to a receiving terminal, the wave train circuits 30 may, as shown in Figure 5, include a video amplifier 94 to which the received pulse train wave is applied from terminal 67. The received train wave includes a synchronizing pulse during each complete cycle of the wave train which is employed to control the operation of the pulse generator 32. The pulse train from amplifier 94 is applied thru bus 66 to all of the receiving channel units, and is also applied thru lead 95 to the synchronizing pulse separator 96 which separates the synchronizing pulse from the pulse train. The separated synchronizing pulse is applied over lead 97 to a frequency multiplier 98, which in turn controls the pulse generator 32. As has been described, the stepwave commutator system operates to gate the channel units so that the message modulated pulses are segregated in the channel units to provide separate outputs for each of the message signals. In the example given, there are fourteen channel units, and therefore there are fourteen separate message channels on fourteen output terminals. Channel unit number 24 may be reserved for the synchronizing pulse, in which case there are thirteen message channels.

It is apparent that the stepwave commutation system of this invention is applicable to both transmitting and receiving terminals of a time division pulse multiplex system, and that the system is adaptable for various combinations of message channels as regards the number of channels and the bandwidths of the various channels.

What is claimed is:

1. In a time division multiplex system, an electronic stepwave commutator, comprising, a master stepwave generator for generating a stepwave having $n$ successive progressively higher risers per cycle, a plurality of sub-stepwave generators having inputs coupled to the output of said master stepwave generator and producing sub-stepwaves, each of said sub-stepwave generators being operative to generate a riser in response to a different one of said $n$ risers; a stepwave counter having an input coupled to the output of said master stepwave generator to generate one output pulse for every $m$ cycles thereof; means coupled to and responsive to the output of said counter for producing pulses at a frequency which is a multiple of the frequency of the output pulses of said counter; and means coupling the outputs of said counter and said last means to different ones of said sub-stepwave generators to determine the cyclic period of the sub-stepwaves.

2. In a time division multiplex system, an electronic stepwave commutator, comprising, a master stepwave generator for generating a stepwave having $n$ successive progressively higher risers per cycle; a plurality of sub-stepwave generators having inputs coupled to the output of said master stepwave generator, each of said sub-stepwave generators being operative to generate a riser in response to a different one of said $n$ risers; a stepwave counter having an input coupled to the output of said master stepwave generator to generate one output pulse for every $m$ cycles thereof; at least one multivibrator, and synchronizing means coupled from an output of said counter to said multivibrator to cause it to operate at a frequency which is a multiple of the frequency of said counter; and means coupling the outputs of said counter and said multivibrator to respective ones of said sub-stepwave generators to determine the cyclic period of said sub-stepwaves.

3. In a time division pulse multiplex system, an electronic stepwave commutator, comprising, a master stepwave generator for generating a stepwave having $n$ successive progressively higher risers per cycle of the master stepwave; a plurality of sub-stepwave generators having inputs coupled to the output of said master stepwave generator, each of said sub-stepwave generators being operative to generate a riser in response to a different one of said $n$ risers, said sub-stepwave generators including a discharge device for determining the termination of the stepwave generated therein; a stepwave counter having an input coupled to the output of said master stepwave generator to generate one output pulse for every $m$ cycles thereof; at least one multivibrator, and coupling means from the output of said counter to said multivibrator to cause it to operate at a frequency which is a multiple of the frequency of said counter; and means individually coupling the outputs of said counter and said multivibrator to said discharge devices in different ones of said sub-stepwave generators to determine the cyclic period of said sub-stepwaves.

4. A time division pulse multiplex system, comprising, an electronic stepwave commutator as defined in claim 3, and in addition, a plurality of channel units having individual signal terminals, a common pulse train terminal, and individual stepwave input terminals connected to the outputs of respective ones of said sub-stepwave generators, said channel units being biased to be operative following a riser of a predetermined level in the wave from the respective sub-stepwave generators, and wave train circuits coupled to said common terminal of said channel units.

5. A time division pulse multiplex transmitting terminal, comprising, an electronic stepwave commutator as defined in claim 3, and in addition, a plurality of transmitting channel units having individual message signal input terminals, output terminals, and individual stepwave input terminals connected to the outputs of respective ones of said sub-stepwave generators, said transmitting channel units being biased to be operative following a riser of a predetermined level in the wave from the respective sub-stepwave generators, and a combining circuit coupled to the output terminals of said channel units and providing a pulse train wave output.

6. A time division pulse multiplex receiving terminal comprising, an electronic stepwave commutator as defined in claim 3, and in addition, a plurality of receiving channel units having individual signal output terminals, signal input terminals, and individual stepwave input terminals connected to the outputs of respective ones of said sub-stepwave generators, said receiving channel units being biased to be operative following a riser of a predetermined level in the wave from the respective sub-stepwave generators, and an amplifier having an input receptive to a received pulse train wave, and having an output coupled to said signal input terminals of said receiving channel units.

7. In a time division multiplex system, an electronic stepwave commutator comprising, a master stepwave generator for generating a stepwave having $n$ successive progressively higher risers per cycle, a plurality of sub-stepwave generators having inputs coupled to the output of said master stepwave generator and producing sub-stepwaves, each of said sub-stepwave generators being operative to generate a riser in response to a different one of said $n$ risers; a stepwave counter having an input coupled to the output of said master stepwave generator to generate one output pulse for every $m$ cycles thereof; means coupled to and responsive to the output of said counter for producing pulses at frequencies which are multiples of the frequency of the output pulses of said counter; and means individually coupling the outputs of said counter and said last-mentioned means to different ones of said sub-stepwave generators to determine the cyclic period of the sub-stepwave produced by each one of said sub-stepwave generators, said sub-stepwave generators functioning to produce said sub-stepwaves of different cyclic periods according to the particular frequency of the pulses supplied thereto.

8. In a time division multiplex system, an electronic stepwave commutator as claimed in claim 7 and wherein said means coupled to and responsive to the output of said counter includes a plurality of multivibrators, each of said multivibrators being responsive to said output pulses to produce pulses at a frequency which is a multiple of the frequency of said counter, said multivibrators operating at different frequencies.

References Cited in the file of this patent

UNITED STATES PATENTS

| | | |
|---|---|---|
| 2,432,292 | Deal | Dec. 9, 1947 |
| 2,543,736 | Trevor | Feb. 27, 1951 |
| 2,543,738 | Houghton | Feb. 27, 1951 |
| 2,561,172 | Bischoff | July 17, 1951 |
| 2,564,419 | Trevor | Aug. 14, 1951 |
| 2,592,493 | Trevor | Apr. 8, 1952 |